(12) United States Patent
Kuo et al.

(10) Patent No.: US 9,772,520 B2
(45) Date of Patent: Sep. 26, 2017

(54) TOUCH CONTROL DEVICE

(71) Applicants: INTERFACE OPTOELECTRONICS (SHENZHEN) CO., LTD., Guangdong (CN); GENERAL INTERFACE SOLUTION LIMITED, Miaoli County (TW)

(72) Inventors: Yu-Chen Kuo, Guangdong (CN); Chia-Jung Fan, Guangdong (CN); Kuo-Tung Liao, Guangdong (CN)

(73) Assignees: Interface Optoelectronics (Shenzhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 40 days.

(21) Appl. No.: 14/804,420

(22) Filed: Jul. 21, 2015

(65) Prior Publication Data

US 2016/0313589 A1     Oct. 27, 2016

(30) Foreign Application Priority Data

Apr. 23, 2015   (CN) .......................... 2015 1 0198341

(51) Int. Cl.
*G02F 1/1335*   (2006.01)
*G02F 1/1333*   (2006.01)
*G06F 3/041*    (2006.01)

(52) U.S. Cl.
CPC .... *G02F 1/13338* (2013.01); *G02F 1/133308* (2013.01); *G06F 3/0412* (2013.01); *G02F 2001/133334* (2013.01); *G02F 2201/54* (2013.01); *G02F 2202/22* (2013.01); *G06F 2203/04103* (2013.01)

(58) Field of Classification Search
None
See application file for complete search history.

(56) References Cited

U.S. PATENT DOCUMENTS

| 2009/0284946 | A1* | 11/2009 | Yang | H05K 1/0218 361/818 |
| 2011/0227848 | A1* | 9/2011 | Furusawa | G06F 1/1626 345/173 |
| 2013/0120699 | A1* | 5/2013 | Ichihara | H01L 23/552 349/110 |

\* cited by examiner

*Primary Examiner* — Richard Kim
(74) *Attorney, Agent, or Firm* — Rosenberg, Klein & Lee

(57) ABSTRACT

The present invention discloses a touch control device, which is addressed to the rimple problem resulting from the full-lamination design of the touch control panel and the liquid crystal display module. The present invention compensates for the elevation drop of the slightly lower control circuit region of the liquid crystal display module in a thickness-increasing way to make the entire liquid crystal display module have an identical elevation. In some embodiments, the present invention increases the thickness of a portion of a ground tape or an optical adhesion layer to compensate for the elevation drop of the liquid crystal display module with respect to the touch control panel. Thereby, the rimple problem is effectively solved.

7 Claims, 6 Drawing Sheets

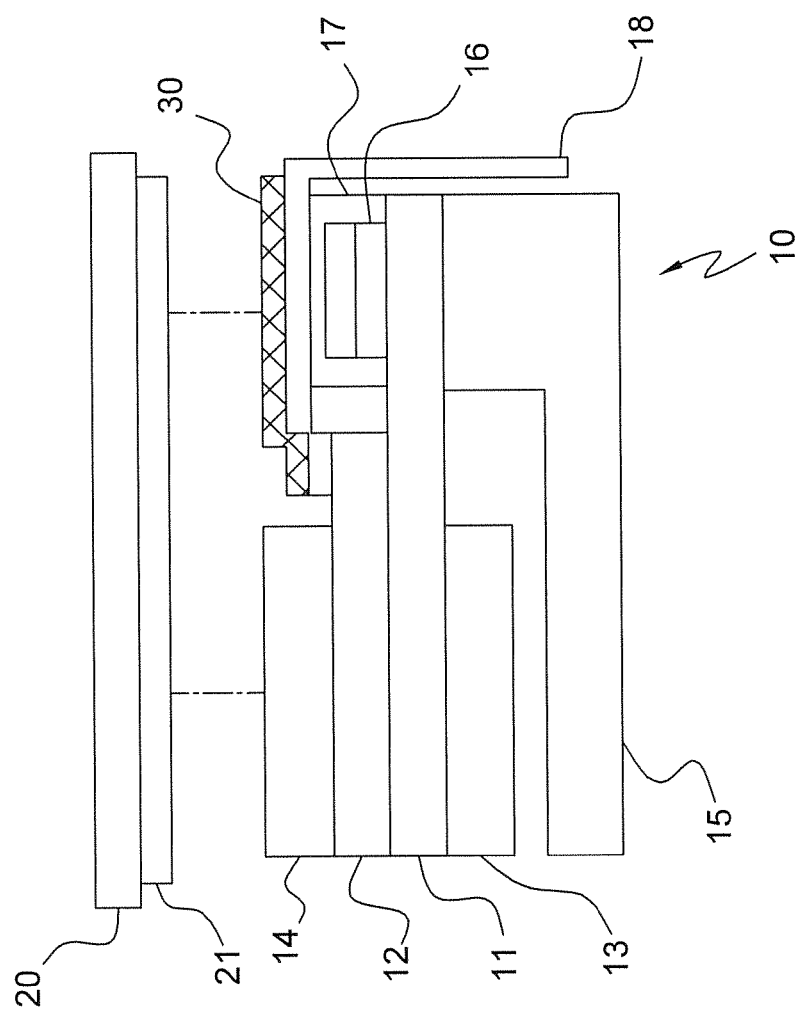

TOUCH CONTROL DEVICE

This application claims priority for China patent application no. 201510198341.9 filed on Apr. 23, 2015, the content of which is incorporated by reference in its entirely.

BACKGROUND OF THE INVENTION

Field of the Invention

The present invention relates to a touch control technology, particularly to a touch control device able to overcome the ripple phenomenon resulting from directly laminating the touch control panel to the liquid crystal display module.

Description of the Related Art

Owing to advance of science and technology, portable electronic products, such notebook computers, tablet computers and smart phones, are extensively used in daily life. With increasing dependency of users, the function of portable electronic products is growing more and more powerful. All these products feature a display screen to present video information. The current tendency is to provide a larger touch control screen to enable consumers to operate these products more easily.

A touch control panel normally comprises a cover lens and a sensor film or a sensor glass. For the next generation touch control technology, low cost and compactness are the main considerations thereof. The OGS (One Glass Solution) technology integrates the cover lens with the sensor film or sensor glass. Thus, only a single piece of cover lens is superimposed on the display panel in the OGS technology. Therefore, the manufacturers pay much attention to the OGS technology.

However, directly laminating a touch panel to a liquid crystal display module is likely to induce a ripple phenomenon. There are many themes involving the ripple problem, and many prior arts proposed various schemes to solve the problem. The conventional touch control screen adopts a glossy polarizing plate to guarantee that the screen has high brightness. However, the glossy polarizing plate is likely to induce ripples affecting the resolution in touch control operations. Therefore, a China patent No.CN201689238 proposed a dull-polished polarizing plate, not only providing high-brightness and high-resolution polarizing plate but also solving the ripple problem.

Another China patent No.CN203069814 proposed a method of using a release film to fabricate a polarizing plate to solve the problem that the conventional polarizing plate is likely to have indentations or blisters in cutting and the problem that the product using the conventional polarizing plate is likely to have the ripple phenomenon in operation.

The abovementioned solutions still have many problems to overcome in practical application. The abovementioned solutions are not directed to the structural problem but only addressed to the polarizing plate. One of the primary factors causing the ripple phenomenon is the elevation difference in the structure of the LCD (Liquid Crystal Display) module. The prior arts did not solve the problem of elevation difference. Even though the touch control device is improved using the abovementioned schemes, the extent of improvement is limited because the elevation difference still persists in the structure. As the manufacturers normally adopt standardized LCD (Liquid Crystal Display) module structures, it is hard to significantly vary the structures of LCD modules. Further, the elevation difference originates from the integration of the touch control panel and the LCD module. Merely varying the structure of one of them is hard to solve the problem of elevation difference. Besides, the numerous elements in the touch control panel and the LCD module further increase the difficulty of varying the designs of them. Therefore, the manufacturers are still beset by the ripple problem and eager to have an effective solution thereof, which not only can integrate with the existing structure and process but also can satisfy the requirement of low cost.

SUMMARY OF THE INVENTION

The primary objective of the present invention is to provide a touch control device to effectively overcome the ripple problem originating from the current full-lamination technology so as to solve the abovementioned conventional problems.

To achieve the abovementioned objective, the present invention proposes a touch control device, which comprises a liquid crystal display (LCD) module, a touch control panel, and a thickness-increasing unit. The LCD module includes a display region and a control circuit region neighboring the display region. Normally, the control circuit region is slightly lower than the display region. The touch control panel is disposed above and joined with the display region and the control circuit region. The thickness-increasing unit is interposed between the touch control panel and the control circuit region of the LCD module, whereby the touch control panel can be smooth laminated to the LCD module, wherefore the ripple problem is effectively solved.

In one embodiment, the thickness-increasing unit is integrated with a ground tape or an optical adhesion layer, whereby the process of the present invention can be integrated with the existing process. Therefore, the present invention achieves the objective of eliminating ripple, neither adding too many fabrication steps nor increasing too much fabrication cost.

Below, embodiments are described in detail to make easily understood the objectives, technical contents, characteristics and accomplishments of the present invention.

BRIEF DESCRIPTION OF THE DRAWINGS

FIG. 1A is an exploded view schematically showing a touch control device according to a first embodiment of the present invention;

DETAILED DESCRIPTION OF THE INVENTION

Figure 1B:
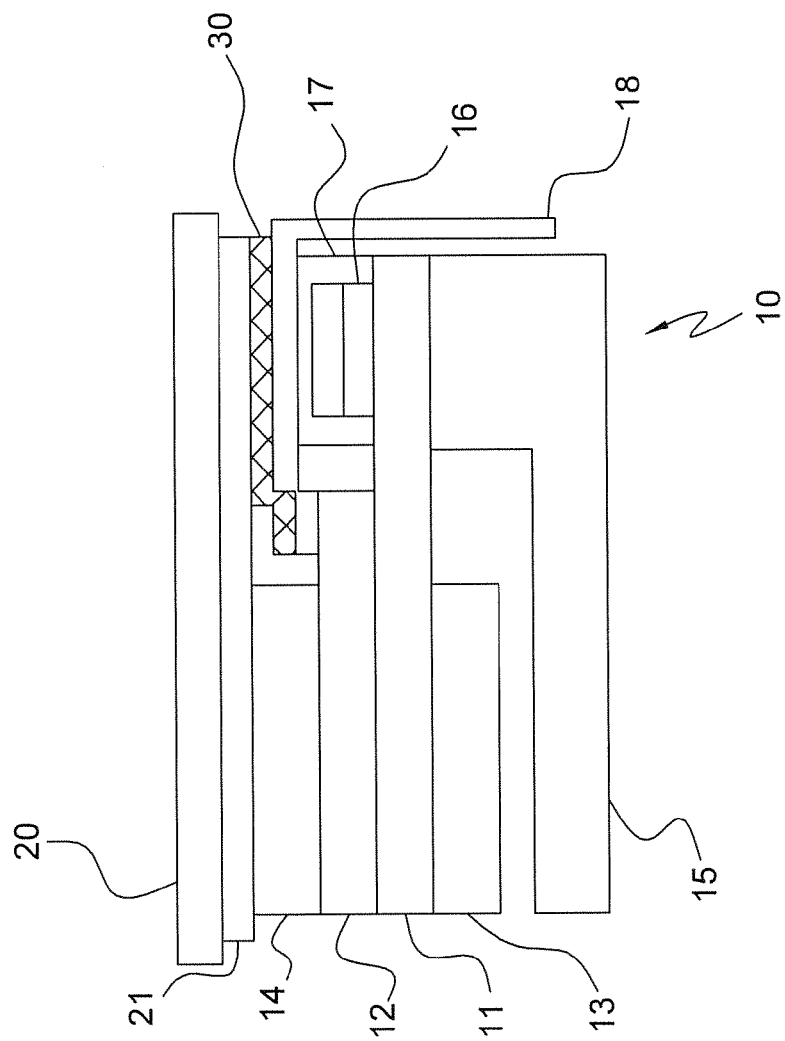
FIG. 1B is a diagram schematically showing a touch control device according to the first embodiment of the present invention.

Refer to FIG. 1A and FIG. 1B diagrams schematically showing the structure of a touch control device according to a first embodiment of the present invention.

The touch control device of the present invention comprises a liquid crystal display (LCD) module 10, a touch control panel 20 and a thickness-increasing unit 30. The LCD module 10 includes a glass layer 11, a color filter layer 12 disposed above the glass layer 11, an upper polarizing plate 14 disposed above the color filter layer 12, a lower polarizing plate 13 disposed below the glass layer 11, and a backlight module 15 disposed below the lower polarizing plate 13, which jointly forms a display region. The glass layer 11 extends outward to receive a control circuit region. The control circuit region includes at least one control integrated circuit (IC) 16, a circuit protection device 17 shielding the control IC 16, and a ground tape 18 disposed on the circuit protection device 17 and extended to a ground terminal.

The touch control panel 20 is joined with the display region and the control circuit region of the LCD module 10. In other words, the touch control panel 20 is full laminated to the LCD module 10. It is obviously shown FIG. 1A and FIG. 1B: the two regions where the touch control panel 20 is attached do not have an identical elevation but have an elevation difference therebetween. In other words, the elevation of the upper polarizing plate 14 is greater than that of the circuit protection device 17, i.e. the left side is slightly higher than the right side. While the user touches this area of the touch control device where the elevation difference exists (normally near the perimeter of the touch control panel 20), the structural drop is likely to cause the ripple phenomenon.

Therefore, the present invention interposes the thickness-increasing unit 30 between the touch control panel 20 and the control circuit region of the LCD module 10 to increase the elevation of the control circuit region having a lower elevation and eliminate the elevation difference therebetween. Thus, the upper polarizing plate 14 and the circuit protection device 17 have an identical elevation or an almost identical elevation. In practical application, the thickness of the thickness-increasing unit 30 is about 0.01-0.25 μm. Then, the touch control panel 20 can be smooth laminated to the LCD module 10. Therefore, the original structural drop is no more likely to cause the ripple problem.

Figure 2:
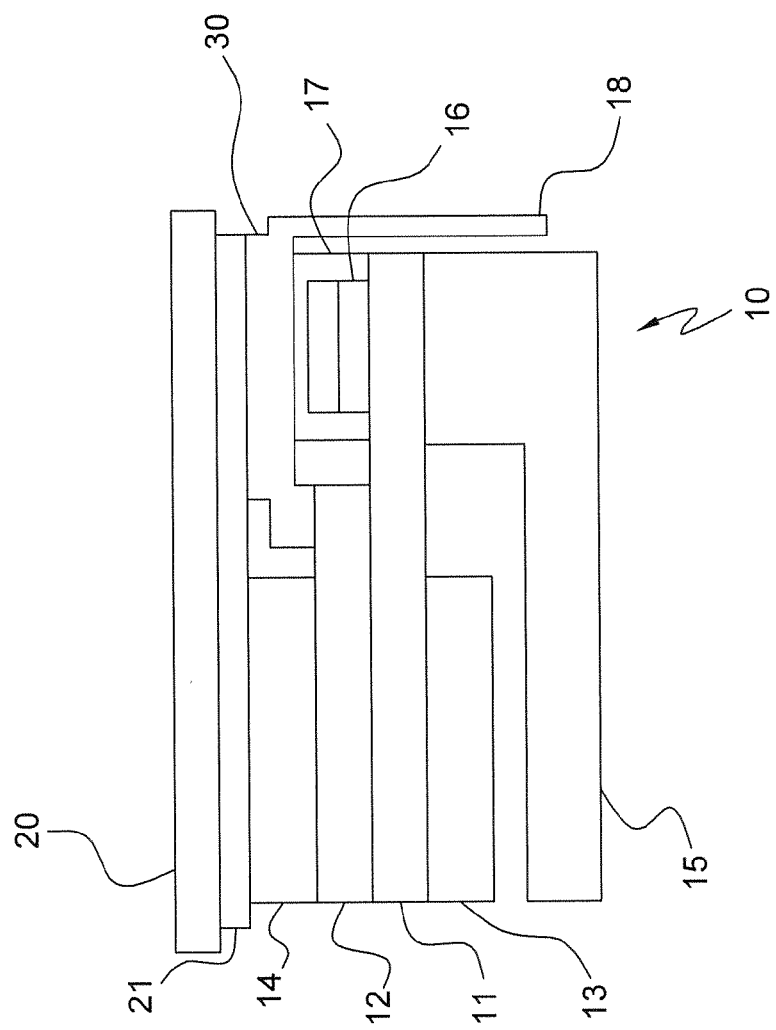
FIG. 2 is a diagram schematically showing a touch control device according to another aspect of the first embodiment of the present invention.

Refer to FIG. 1A and FIG. 1B again. In the embodiment shown in FIG. 1A and FIG. 1B, the thickness-increasing unit 30 is disposed in an area of the ground tape 18, which is corresponding to circuit protection device 17, to increase the thickness of the area involving the circuit protection device 17, whereby the elevations of the display region and the control circuit region have an identical elevation and the structural drop therebetween is eliminated. Thus, the annoying ripple problem is eliminated. Further, the structural smoothness can increase the strength of the entire structure. In one embodiment, the thickness-increasing unit 30 is made of a material identical or similar to the material of the ground tape 18 so as to reduce the complexity of fabrication. In one embodiment, the thickness-increasing unit 30 is integrated with the ground tape 18 to form a one-piece component so as to further decrease the fabrication steps, wherein the ground tape 18 is designed to be a two-stage tape, as shown in FIG. 2, whereby while the ground tape 18 is applied, the thickness-increasing unit 30 is also installed simultaneously.

Figure 3A:
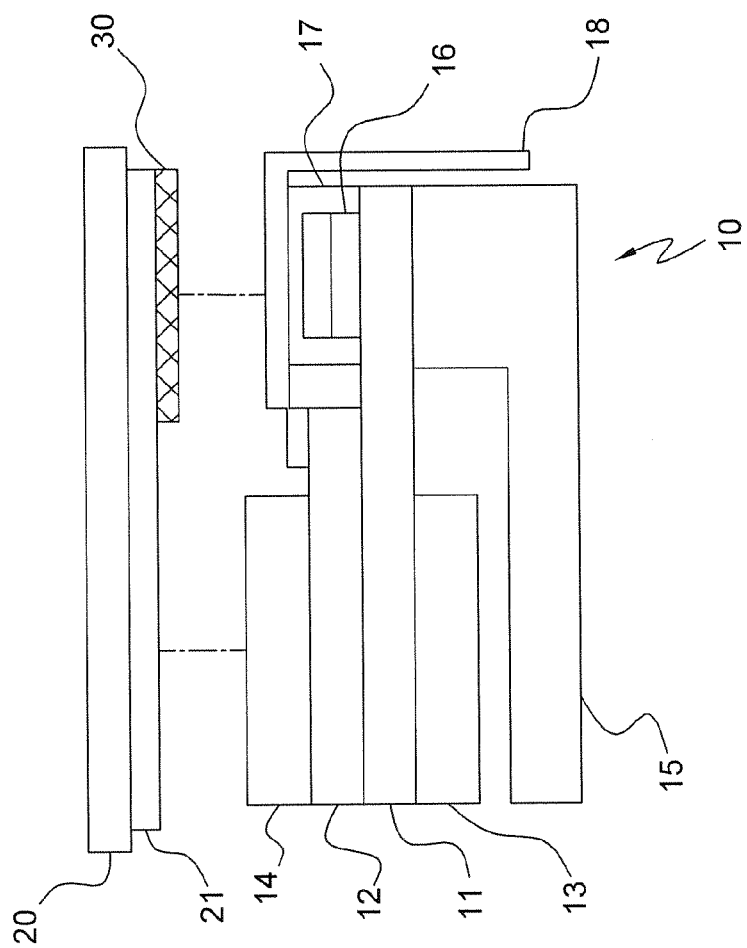
FIG. 3A is an exploded view schematically showing a touch control device according to a second embodiment of the present invention.
Figure 3B:
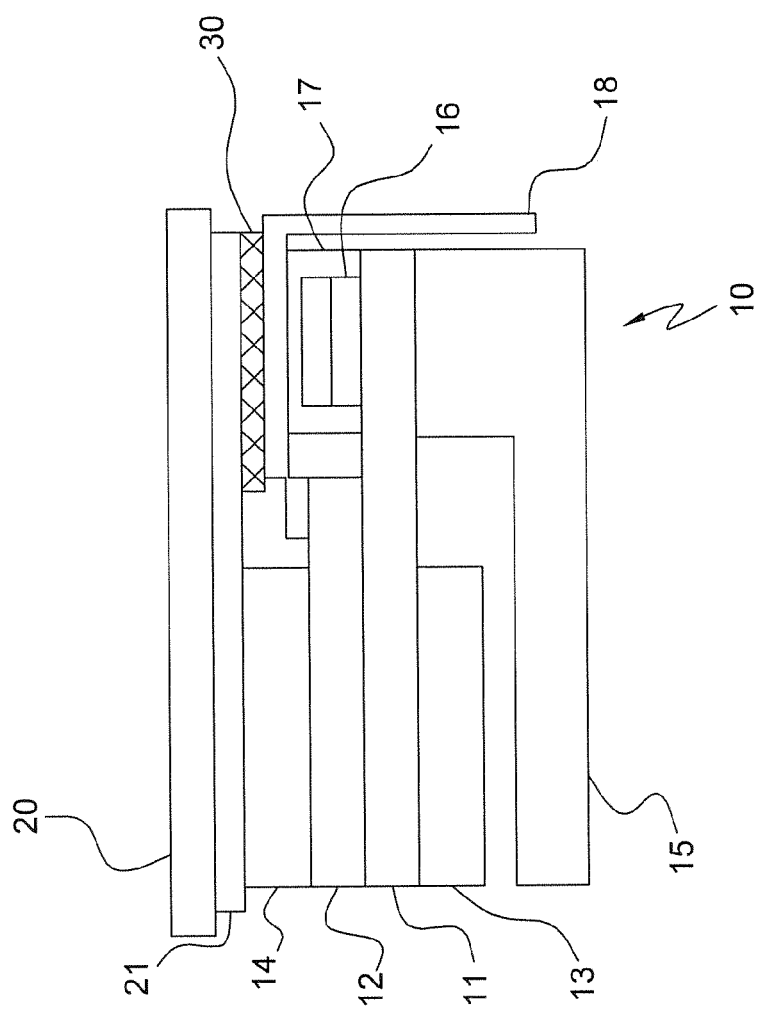
FIG. 3B is a diagram schematically showing a touch control device according to the second embodiment of the present invention.

Refer to FIG. 3A and FIG. 3B diagrams schematically showing the structure of a touch control device according to a second embodiment of the present invention.

Normally, the touch control panel 20 is laminated to the LCD module 10 with an optical adhesion layer 21. In one embodiment, the optical adhesion layer 21 is an optical clear adhesive (OCA) or an optical clear resin (OCR). The thickness-increasing unit 30 is disposed on the bottom of the optical adhesion layer 21 to increase the thickness of the area of the optical adhesion layer 21, which is adjacent to the control circuit region, and eliminate the structural drop of the control circuit region and the display region, whereby the touch control panel 20 can be smooth applied to the LCD module 10.

Figure 4:
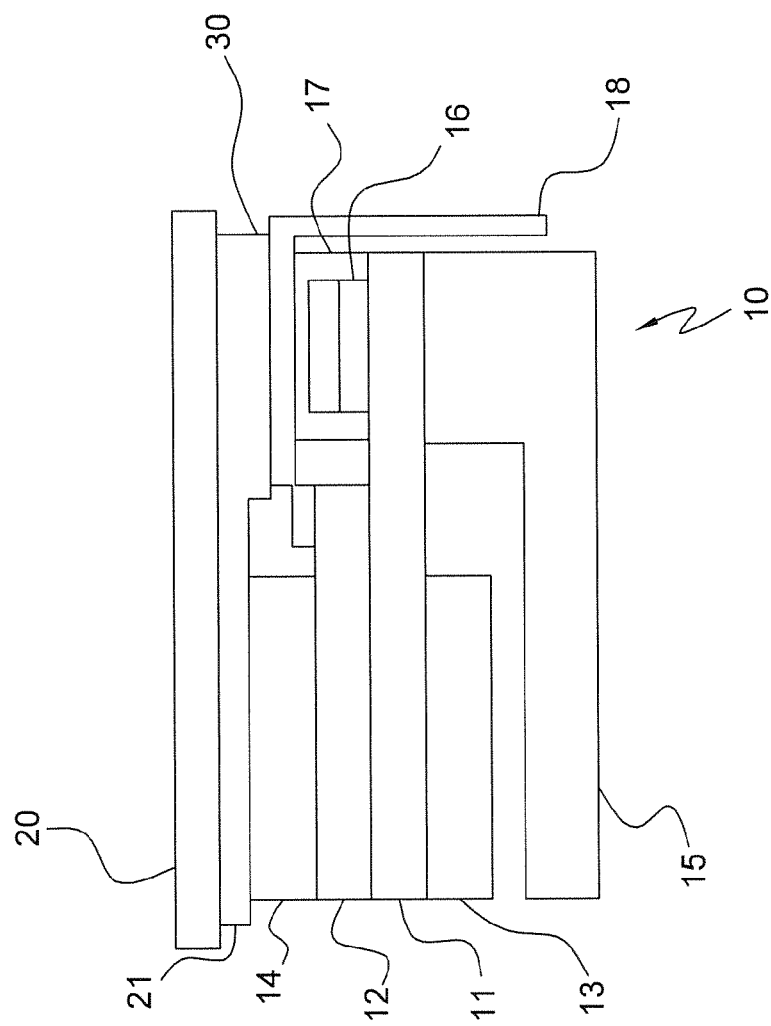
FIG. 4 is a diagram schematically showing a touch control device according to another aspect of the second embodiment of the present invention.

In one embodiment, the thickness-increasing unit 30 is made of a material identical or similar to the material of the optical adhesion layer 21. In one embodiment, the thickness-increasing unit 30 is integrated with the optical adhesion layer 21 to form a one-piece component so as to further decrease the fabrication steps, wherein the optical adhesion layer 21 is designed to be a two-stage layer, as shown in FIG. 4, whereby the touch control panel 20 can be smooth laminated to the LCD module 10.

In comparison with the conventional technology, the touch control device of the present invention can effectively solve the ripple problem in almost the same cost and features simple structure, easy fabrication and high commercial competitiveness.

The embodiments described above are only to exemplify the present invention but not to limit the scope of the present invention. Any equivalent modification or variation according to the characteristic or spirit of the present invention is to be also included within the scope of the present invention.

What is claimed is:

1. A touch control device at least comprising:
   a liquid crystal display module including a display region and a control circuit region neighboring said display region and slightly lower than said display region;
   a touch control panel joined with said display region and said control circuit region of said liquid crystal display module;
   an optical adhesion layer joining said touch control panel to said liquid crystal display module; and
   a thickness-increasing unit interposed between said touch control panel and said control circuit region of said liquid crystal display module to enable said touch control panel smooth laminated to said liquid crystal display module;
   wherein said thickness-increasing unit is disposed on said optical adhesion layer to increase a thickness of an area of said optical adhesion layer, which is adjacent to said control circuit region, so as to make said control circuit region and said display region have an identical elevation.

2. The touch control device according to claim 1, wherein said liquid crystal display device includes a glass layer and a color filter layer disposed over said glass layer.

3. The touch control device according to claim 2, wherein a lower polarizing plate is disposed below said glass layer, and an upper polarizing plate is disposed over said color filter layer.

4. The touch control device according to claim 2, wherein said glass layer is extended outward to receive said control circuit region.

5. The touch control device according to claim 4, wherein said control circuit region at least includes at least one control integrated circuit and a circuit protection device shielding said control integrated circuit.

6. The touch control device according to claim 2, wherein said liquid crystal display module further includes a backlight module.

7. The touch control device according to claim 1, wherein said thickness-increasing unit has a thickness of about 0.01-0.25 μm.

\* \* \* \* \*